INVENTORS.
Jack M. Brandstadter.
John E. Taylor.
BY
Harness, Dickey & Pierce
ATTORNEYS.

United States Patent Office 2,929,391
Patented Mar. 22, 1960

2,929,391

HYDRAULIC CONTROL SYSTEM FOR PROVIDING AN HYDRAULIC PRESSURE OUTPUT PROPORTIONAL TO A CONTINUOUSLY VARIABLE CONDITION

Jack M. Brandstadter and John E. Taylor, Royal Oak, Mich., assignors to Cadillac Gage Company, Detroit, Mich., a partnership of Michigan Application November 29, 1956, Serial No. 625,181

2 Claims. (Cl. 137—85)

This invention relates to improvements in hydraulic control systems generally and more particularly to precision hydraulic control systems which produce a controllable pressure output.

Important objects of the invention are to provide an improved combination of means constituting an hydraulic control system for use on aircraft for producing an hydraulic pressure output proportional to a continuously variable condition; and to provide such combination of means in a form which includes an improved unitary converter assembly having means for converting electrical impulses received from a sensing device into a continuously variable hydraulic pressure output and including means for sensing the hydraulic pressure output produced to effect a continuous correction in the electrical impulses fed to the input of the converter assembly whereby the ultimate hydraulic pressure output is an extremely accurate and reliable function of the said condition.

It is still another object of the invention to provide an hydraulic control system which is compact, light in weight, rugged in construction and reliable in operation whereby it is primarily adapted and pre-eminently suited for aircraft use.

The above and related objects of the invention will become apparent during the course of the following description taken in conjunction with the accompanying drawings.

In the drawings:

Fig. 3 is a schematic view of the amplifier-demodulator unit which functions in conjunction with the converter assembly.

Figure 1:
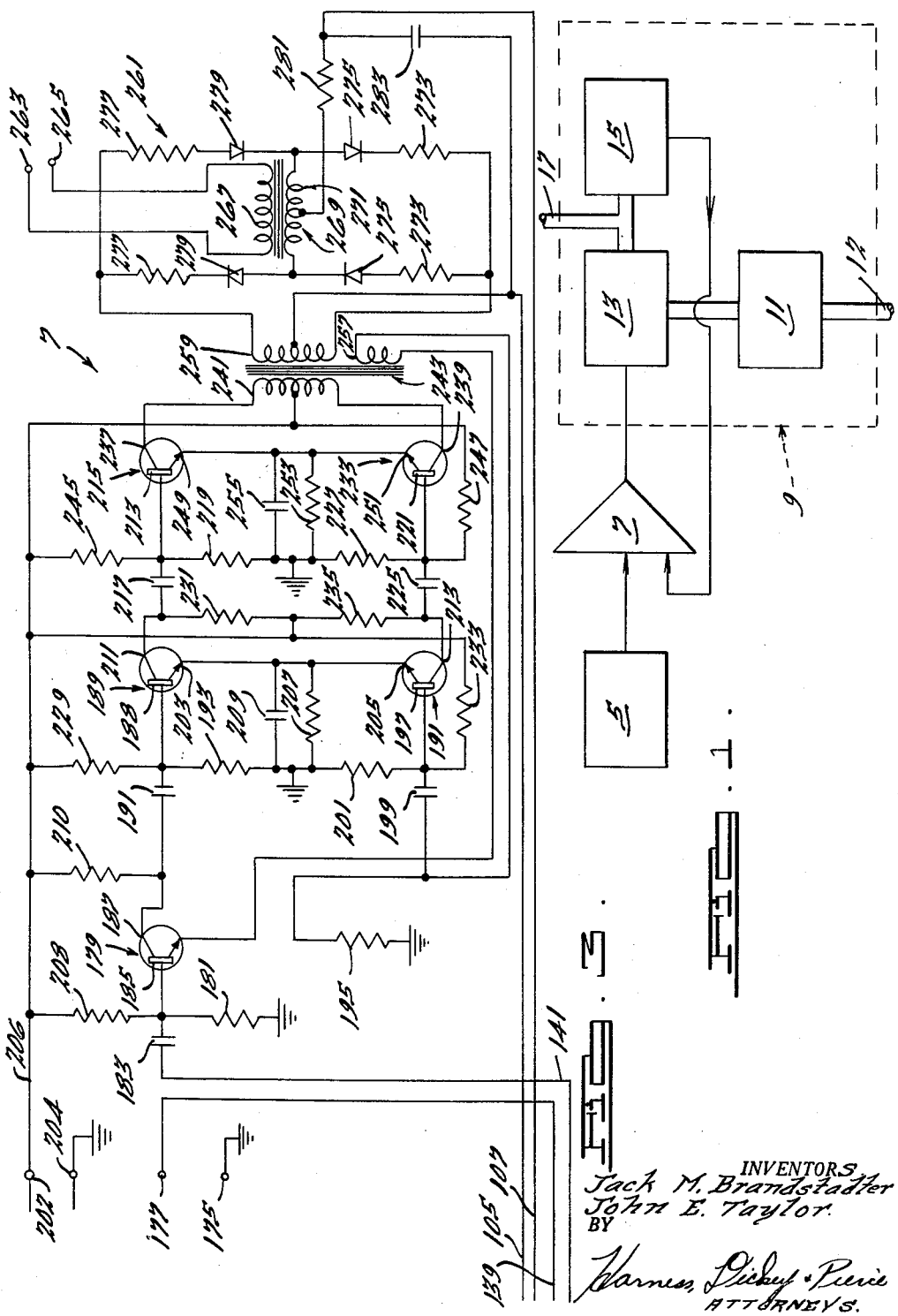
Figure 1 is a diagrammatic view of the over-all hydraulic control system embodying the present invention.

Referring now to the drawing and particularly to Fig. 1 the over-all hydraulic control system is shown therein in block diagram, each block of which represents a major component indicated generally by a reference numeral. The major components include the structure enumerated and designated respectively as follows: sensing means 5, amplifying-demodulating means in the form of an amplifier-demodulator unit 7, a self-contained converter assembly 9 which comprises pressure regulating means 11, pressure-modulating valving means 13, and pressure transducer means 15.

The sensing means 5 in the embodiment of the invention to be described is of a type known as a Mach sensor which functions to produce an A.C. signal proportional to the Mach number of an aircraft for use with which the hydraulic control system is primarily intended and adapted. The Mach number is a measure of the speed of an aircraft and the output of the sensing means 5 or Mach sensor in this instance is a 400 cycle audio-modulated signal derived from well known means not constituting a part of the present invention. The amplitude of the signal output of the sensing means 5 is proportional to the Mach number of the aircraft and its polarity or phase depends upon whether the Mach number being sensed is greater or less than a predetermined Mach number arbitrarily selected as the null point of the sensing means. It will be apparent that the particular sensing means may be any one of a variety of devices which are arranged to produce an A.C. signal as a function of a continuously variable condition. The condition ultimately to be sensed and as a function of which an hydraulic output is desired need not necessarily be the speed of an aircraft but may be any other condition, as for example, altitude, roll angle, pitch attitude, or acceleration.

The audio-modulated signal from the Mach sensor is fed into the amplifier-demodulator unit 7 simultaneously with an audio-modulated correction signal having the same carrier frequency as the signal from the Mach sensor. The correction signal varies as a function of the main pressure output and is fed back from the pressure transducer means 15 as will be described more particularly hereinafter. The signal from the Mach sensor and the correction signal from the pressure transducer means 15 are algebraically added, the resultant signal amplified, and subsequently demodulated by the amplifier and demodulator sections respectively of the amplifier-demodulator unit 7. The demodulated output of the amplifier-demodulator unit is then fed into the pressure-modulating valving means 13 of the converter assembly 9. The pressure-modulating valving means 13 functions in response to the demodulated signal from the amplifier-demodulator 7, as will be described, to produce an hydraulic pressure output, as at 17, which is a continuous function of the varying condition sensed by the sensing means 5. The pressure-modulating valving means 13 is supplied with a constant hydraulic pressure by the pressure regulating means 11 which in turn is fed, as by line 12, from a usually fluctuating source (not shown). To compensate for the lag inherent in the movement of the mechanical parts of the system and in the pressure changes in the hydraulic circuits, pressure sensing means in the form of the pressure transducer 15 is provided which is responsive to the hydraulic pressure output and which produces an A.C. signal as a function thereof which is fed back to the amplifier as a correction signal to prevent over shooting of the target condition desired in the pressure output of the system.

Figure 2:
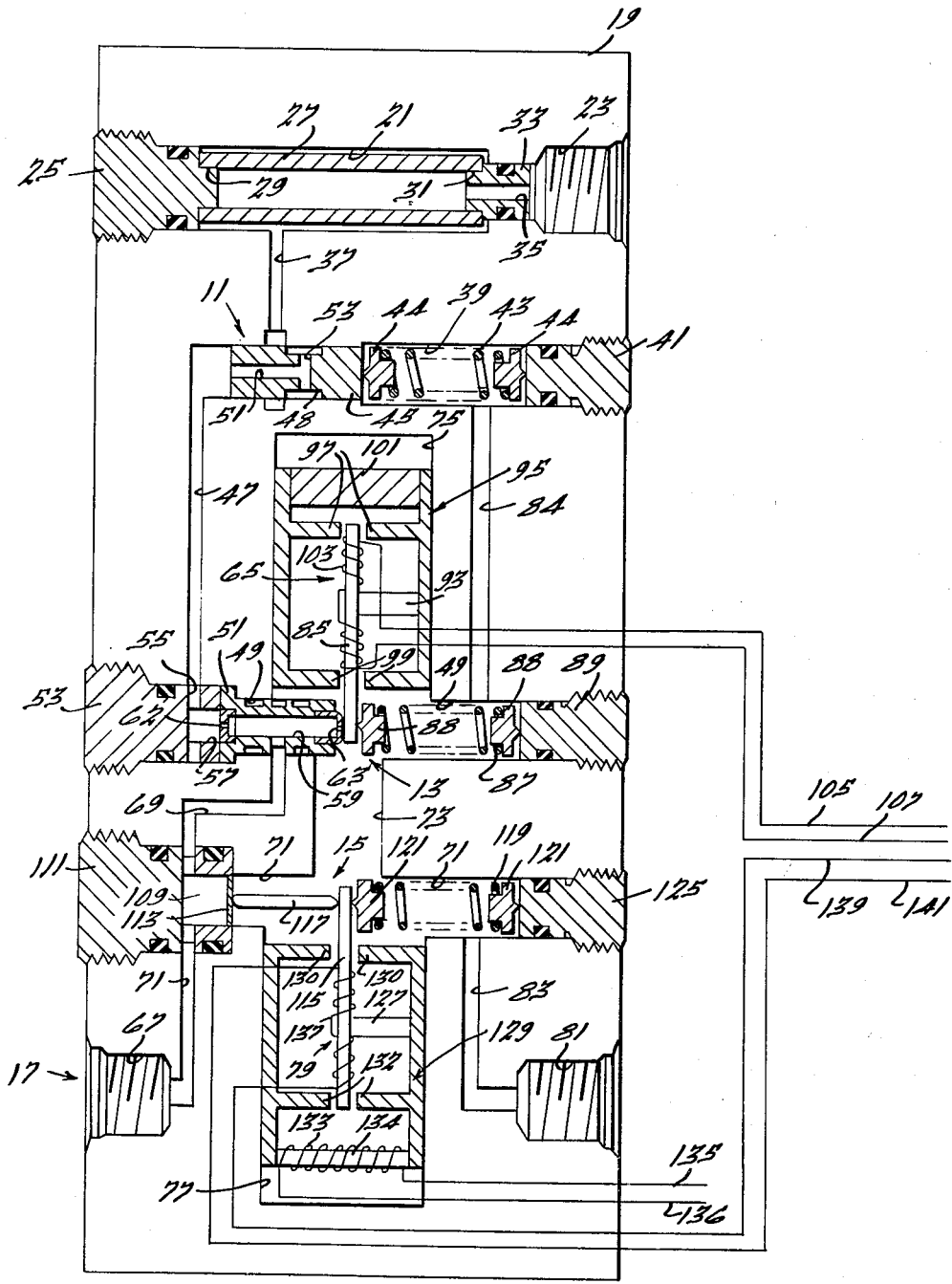
Fig. 2 is a sectional view of the converter assembly constituting a part of the hydraulic control system embodying the invention.

In Fig. 2 the details of the construction of the self-contained converter assembly 9 are shown which comprises a housing, generally designated 19, in which is provided a longitudinal bore 21. One end of the bore 21 is formed into a threaded inlet 23 into which is fed hydraulic fluid usually at a fluctuating pressure. The other end of the bore 21 is closed by a threaded plug 25 received in the other side of the housing 19. Disposed centrally lengthwise of and within the bore 21 is an annular filter member 27, one end of which, as at 29, is secured about the plug 25 and the other end, as at 31, is fitted about a cylindrical member 33 which is disposed inwardly of the inlet 23 and is provided with an aperture 35 through which fluid supplied to the inlet 21 flows to reach the chamber formed within the filter 27.

The hydraulic fluid passing through the filter member 27 passes by way of a transverse passageway 37 into a second longitudinal bore 39 in which the pressure regulating means 11 operates. The structure of the pressure regulating means 11 comprises a plug member 41 threadably received in the bore 39 from one side of the housing 19. Disposed inwardly of the plug 41 is a compression spring 43, the opposite ends of which are secured about members 44. The spring 43 normally biases a piston member 45 inwardly toward the passageway 37 so that the latter is normally in communication with a transverse passageway 47 which leads from the bore 39. The piston member 45 is provided with an annular recess 48 which communicates with a longitudinal passageway 51 therein by means of a radial aperture 53 through which the pressure fluid from the passageway 39 passes in its travel to the passageway 47. The piston member 45 is slidably disposed within the bore 39 so that the annular recess 48 continually moves with respect to the port at the base of the passageway 37 due to fluctuations in the pressure supplied at the inlet 21. When the pressure in the passageway 47 falls below a predetermined value due to a drop in the supply pressure the piston member 45 is actuated to the left as viewed in Fig. 2 by the spring 43 to allow more fluid to pass to the passageway 47 so as to compensate for the drop in pressure in the passageway 47. Similarly, when the pressure in the passageway 47 increases above the predetermined value due to a rise in the supply pressure piston member 45 is actuated to the right as viewed in Fig. 2 against the urging of the spring 43 to decrease and in some cases cut off the flow of fluid to the passageway 47. The net result is that the pressure within the passageway 47 is maintained at the predetermined value irrespective of fluctuations in the pressure of the hydraulic fluid supplied at the inlet 21. The predetermined value at which the pressure in the passageway 47 is maintained is adjustable by varying the setting of the plug 41.

The passageway 47 in which a constant hydraulic pressure is maintained communicates with a third longitudinal bore 49 provided in the housing 19. The bore 49 is divided substantially centrally of its length as shown by relatively large intercommunicating transverse chambers the purposes of which will be described hereinafter. Portions of the structure of the pressure modulating valving means 13 are disposed within the bore 49 and these portions comprise a nozzle assembly 51 which is disposed contiguously with a plug member 53 provided with a radial aperture, as at 55, and a longitudinal passageway 57. The member 53 is threadably secured in the bore 49 at the other side of the housing 19 and the aperture 55 and passageway 57 therein direct pressure fluid from the passageway 47 into the interior of the nozzle holder 51. The nozzle assembly 51 is composed of a central chamber 59 and a pair of orifices 62 and 63 at opposite ends thereof, the orifice 62 being fixed and the orifice 63 being controllable. The pressure of the fluid in the central chamber 59 is isolated from the constant pressure of the fluid in the passageway 47 by the pressure drop effected across the fixed orifice 62 secured in the entrance end of the nozzle holder 51. The flow through the orifice 63 in the exit end of the nozzle assembly 51 is controlled by the pressure modulating valving means 13 which includes a stroke motor, generally designated 65, provided with means to alternately restrict and increase the flow through and hence vary the pressure drop across the orifice 63. The pressure of the fluid in the chamber 59 of the nozzle holder 51 is proportional to the pressure drop across the orifices 62 and 63 and this pressure is reflected at the output 17, previously referred to, since the outlet opening 67 in the housing 19 is in direct communication with the chamber 59 by the passageways 69, 71, respectively, which direct fluid transversely through a fourth longitudinal bore 71 extending through the housing 19.

The longitudinal bore 71 houses portions of the structure of the pressure transducer means 15, the construction and operation of which will be described hereinafter. The bore 71 is in communication with the bore 49 through an enlarged transverse passageway 73. Disposed above the bore 49 and in communication therewith is an enlarged chamber 75 and disposed below the bore 71 and in communication therewith is a similar enlarged chamber 77. The stroke motor 65 is disposed within the enlarged chamber 75 and a signal generator, generally designated 79, constituting an element of the pressure transducer means 15 is disposed within the enlarged chamber 77. The hydraulic fluid flowing through the nozzle 63 enters the enlarged aperture 73 which in turn is in communication with the drain outlet 81 by way of the bore 71 and the passageway 83. The drain outlet 81 is adapted to be connected to the return side of the source of pressure fluid supplying the converter assembly. Thus the stroke motor 65 and the signal generator 79 are immersed in hydraulic fluid which is at a pressure corresponding to the drain or return pressure at the drain outlet 81. So also are the portions of the bores 39 and 49 behind the piston member 45 and the lower end of the armature 85, respectively, since these portions are interconnected by the transverse passageway 84. The flow through and hence the pressure drop across the orifice 63 is controlled by the movement of the lower end of an armature 85 which functions in a manner to be described in response to electrical sensing means constituting an element of the stroke motor 65. The lower end of the armature 85 operates against the urging of a compression spring 87 disposed within the bore 49, the opposite ends of which are secured about members 88. One of the members 88 is continually in engagement with the lower end of the armature 85 and the other operates against the fixed plug member 89 threadably received in the bore 49 on the one side of the housing 19.

The armature 85 is pivoted substantially centrally of its length by a rigid member 93 fixed to a low reluctance magnetic structure indicated generally at 95 having the configuration in cross-section as shown. The structure 95 provides one pair of spaced pole faces 97 disposed about the upper end of the armature 85 and another pair 99 disposed at opposite sides of the armature approximately midway between its lower end and the point where it is pivotally mounted. A polarizing magnet 101 is secured to the upper end of the structure 95 above the pair of pole faces 97. An electrical coil 103 in the form of a pair of series connected windings in the instance shown is arranged about the armature 85 and fed by electrical lines 105, 107 which constitute the output of the amplifier-demodulator unit 7 to be described. In well known manner the coil 103 induces magnetic poles in the armature 85 which are alternately attracted and repelled by one and the other of the pole faces of each of the pairs 97, 99 so that the movement of the armature 85 is a continuous function of the electrical current received in the lines 105, 107. Thus the lower end of the armature 85 adjacent the orifice 63 restricts and enlarges the flow therethrough and hence the pressure drop thereacross as a function of the signals received from the amplifier-demodulator unit 7. The fluid pressure in the chamber 59 increases and decreases correspondingly as the pressure drop across the orifice 63 varies and the fluctuations in the pressure of the fluid in the chamber 59 are transmitted to the outlet 67 by the system of passageways previously described.

The output pressure at the outlet 67 is reflected in the chamber 109 provided in a fitting 111 threadably secured in the bore 71 at the other side of the housing 19 as shown. The fitting 111 has secured at its inner end a diaphragm 113 which forms one wall of the chamber 109 so that the fluctuations of the hydraulic pressure in the chamber 109 are transformed into mechanical movements of the diaphragm 113. The mechanical movements of the diaphragm 113 are transmitted by a stylus 117 to an armature 115 constituting an element of the signal generator 79. One end of the stylus 117 contacts the diaphragm 113 and the other end engages the armature 115 on one side thereof. On the other side of the armature 115 and disposed within the bore 71 is a compression spring 119 the opposite ends of which are fitted about members 121. One of the members 21 continually engages the upper end of the armature 115 and the other operates against a fixed plug member 125 threadedly secured in the bore 71 at one side of the housing 19 as shown. The spring 119 yieldably urges the armature 115 against the stylus 117 and the stylus against the diaphragm 113 so that the mechanical movement of the diaphragm is accurately reproduced in the movement of the armature 115.

The armature 115 of the signal generator 79 is pivotally mounted by a support member 127 which is fixed to a low reluctance structure, generally designated 129, similar to the structure 95 of the stroke motor 65. The structure 129 is provided with pairs of spaced pole faces 130, 132 as in the structure 95 but in lieu of a polarizing magnet the structure 131 is provided with an excitation primary coil 133 disposed about a core 134 secured at the lower end of the structure 131 below the pair of pole faces 132. The primary coil 133 is supplied through electrical lines 135, 136 with an A.C. carrier signal of the same frequency as that of the carrier of the modulated output from the sensing means 5. Arranged with respect to the armature 115 so as to induce magnetic poles therein is a secondary coil 137 which in the form shown comprises a pair of series connected windings disposed about the armature 115 on opposite sides of the pivot connection therefor. As the armature 115 is continuously actuated in response to the fluctuations of the hydraulic pressure output at the outlet 67 by the diaphragm 113 and stylus 117 a voltage is being continually induced in the secondary coil 137 by the primary coil 133, the magnitude and polarity of which is proportional to the amplitude and direction of vibration of the armature 115. The voltage induced in the secondary coil 137 is thus modulated by the movement of the armature 115 between the pairs of pole faces 130, 132 and fed by the electrical lines 139, 141 into the amplifier-demodulator unit 7 where it is added to the modulated signal from sensing means 5.

Referring now to Fig. 3, therein is shown one embodiment of the amplifier-demodulator unit 7, the input for which is applied across grounded terminal 175 and terminal 177 and fed to a transistor, indicated generally at 179. The input to the amplifier-demodulator unit 7 is the algebraic sum of the modulated signal output from the sensing means 5 applied to the terminals 175, 177 and the signal output from the pressure transducer means 11 induced in the secondary coil 137 which is in series with the terminals 175, 177. The voltage from the sum total of the two modulated signals is developed across the base resistor 181 through a coupling capacitor 183 and fed to the base 185 of the transistor 179. The voltage at the collector 187 of the transistor 179 is fed to the base 188 of a transistor 189 through the coupling capacitor 191 and base resistor 193. The transistor 179 functions as a phase inverter to permit push-pull operation of the succeeding stages and the out-of-phase voltage developed across the emitter resistor 195 for the transistor 179 is applied to the base 197 of a transistor 191 through a coupling capacitor 199 and base resistor 201. The transistors 189 and 191 are arranged to operate in push-pull. The power supply for the amplifier can be any of the conventional power supplies on an aircraft and for the amplifier being described a D.C. source of approximately 28 volts is applied at the terminals 202, 204, the latter terminal being at ground potential as shown. The lead 206 from the terminal 202 carries the voltage from the power supply which is applied to the base 185 and collector 187 of the phase inverter transistor 179 through suitable voltage dropping resistors 208, 210 respectively.

The emitters 203, 205 of the push-pull operating transistors 189, 191 respectively are tied together and to ground through the RC network consisting of the resistor 207 and capacitor 209. The output from the collector 211 of the transistor 189 is fed to the base 213 of a transistor 215 through the coupling capacitor 217 and base resistor 219. Similarly, the output from the collector 213 of the transistor 191 is fed to the base 221 of a transistor 223 by the coupling capacitor 225 and base resistor 227. The power supply voltage from the line 206 is applied to the base 188 and collector 211 of the transistor 189 by dropping resistors 229, 231 respectively and is similarly applied to the base 197 and collector 213 of the transistor 191 through dropping resistors 233, 235 respectively. The pair of transistors 215, 223 are power amplifiers operating in push-pull and the amplified modulated outputs from their collectors 237, 239 respectively are fed to the primary coil 241 of an iron core output transformer indicated generally at 243. Dropping resistors 245, 247 apply the voltage from the line 206 to the bases 213, 221 of the transistors 215, 223 respectively. The emitters 249, 251 are tied together and to ground through a resistor 253 and capacitor 255 connected in parallel. A secondary coil 257 of the output transformer 243 is connected in the emitter circuit of the phase inverter transistor 179 in series with the emitter resistor 195 to apply a feed back signal from the primary coil 241 to the phase inverter 179 to stabilize the operation of the amplifier.

The voltage from the primary 241 of the output transformer 243 is developed across a main secondary coil 259. The voltage induced in the secondary coil 259 is an amplified modulated A.C. signal, the modulation for which is a combined function of the modulation of the signal from the sensing means 5, and the modulation of the signal from the signal generator 129 of the pressure transducer means 16. The modulated output from the secondary coil 259 is fed to a demodulator section of the amplifier-demodulator unit 7, indicated generally at 261, which is supplied with a source from well known means not shown of an unmodulated carrier signal of the same frequency as the carrier of the modulation from the sensing means 5 and the carrier fed to the signal generator 129. The unmodulated carrier signal for the demodulator section 261 is applied across the terminals 263, 265 and the voltage therefrom is induced in the primary 267 of an iron core transformer, indicated generally at 269, the secondary coil 271 of which has its end lead wires connected to each of the end lead wires of the secondary winding 259 through rectifier and resistor elements. One end lead wire of the secondary winding 259 is connected to the end lead wires of the secondary winding 271 through a pair of parallel branches each branch of which comprises a resistor 273 in series with a rectifier 275. The rectifiers 275 in the two branches are oppositely connected. The other end lead wire of the secondary winding 259 is similarly connected to the end lead wires of the secondary winding 271 through a pair of parallel branches each comprising a resistor 277 and a rectifier 279, the rectifiers 279 being oppositely connected. Through this arrangement the unmodulated carrier signal fed to the terminals 263, 265 and induced in the secondary winding 271 is combined with the modulated signal induced in the secondary winding 259 rectified and detected to recover the modulation envelope. The signal voltage from the modulation envelope is taken off the center taps of the secondary windings 259, 271 developed across the load resistor 281 through the coupling capacitor 283 and fed to the electrical lines 105, 107 leading to the coil 103 of the stroke motor 65. Consequently, the armature 85 of the stroke motor 65 is actuated as a combined function of the continuously varying condition sensed by the sensing means 5 and of the variations in the instantaneous hydraulic pressure at the main pressure outlet 17. In this manner any lag due to the inertia of the mechanical parts and hydraulic fluid of the system is compensated for by sensing the hydraulic pressure output immediately as it is developed.

In operation, fluid pressure from the source enters the converter assembly 9 through the inlet 21, passes through the filter member 27, through the pressure regulating means 11 into the passageway 47 wherein its pressure is maintained at a predetermined value by the movement of the piston member 45 in accordance with the fluctuations in the supply pressure at the inlet 23. The constant pressure fluid from the passageway 47 is directed through the fixed orifice 62 into the chamber 59 in the nozzle holder 51 and thence through the controlled orifice 63 to drain outlet 81. The flow through and hence the pressure drop across the orifice 63 is controlled by movement of the lower end of the armature 85 which is actuated as a continuous function of the electrical impulses received from the amplifier-demodulator unit 7 as described. The lower end of the armature 85 moves toward and away from the orifice 63 against the urging of the coil spring 87 to alternately restrict and enlarge the flow therethrough. The pressure drop across the orifice 63 thus varies as a function of the electrical impulses received from the amplifier-demodulator unit 7 and consequently the pressure in the chamber 59 correspondingly changes since it is isolated from the constant pressure in the passageway 47 by the pressure drop effected across the fixed orifice 62. The hydraulic fluid flowing from the chamber 59 through the chamber 109 in the fitting 111 to the outlet 67 of the converter assembly is that a pressure which is a function of the continuously variable condition sensed by the sensing means 5 corrected for the lag inherent in the hydraulic fluid itself in changing pressure and in the various mechanical parts which effect the variation in the output pressure from the time a signal is received by the stroke motor 65. The pressure transducer means 15 senses the variations in the instantaneous hydraulic pressure output as reflected in the chamber 109 and provides a correction signal by means of the signal generator 79 as described which is fed back to the amplifier-demodulator unit 7 for correcting the signal received from the sensing means 5 to insure that the desired target condition in the output pressure is attained.

It will thus be seen that there has been provided by this invention an hydraulic control system in which the objects hereinabove set forth, together with many thoroughly practical advantages, are successfully achieved. It should be apparent that the invention is susceptible to modification, variation and change without departing from the spirit thereof or from the scope of the appended claims.

What is claimed is:
1. In an hydraulic control system for providing an hydraulic pressure output proportional to a continuously varying condition, the combination comprising a self-contained converter assembly having a housing provided with an inlet and an outlet, a first bore formed in said housing, filter means disposed within said first bore, a second bore formed in said housing, pressure regulating means disposed in said second bore, means for directing fluid pressure from a source of pressure fluid through said filter means and through said pressure regulating means, a third bore formed in said housing, pressure-modulating valving means disposed in said third bore, means to direct pressure fluid from said pressure regulating means to said valving means, said pressure regulating means having means to produce a constant pressure in the fluid flowing therefrom, said valving means comprising in the order of flow therethrough a fixed orifice, a fluid chamber, and a controllable orifice, a fourth bore formed in said housing, pressure-transducer means including a diaphragm chamber disposed in said fourth bore, means to direct pressure fluid from said fluid chamber through said diaphragm chamber to said outlet, a drain outlet in said housing, means to direct the fluid flowing through said controllable orifice, to said drain outlet, a first low reluctance srtucture disposed in said housing having spaced pole faces, a first armature mounted for pivotal movement between said pole faces, one end of said first armature being disposed adjacent said controllable orifice so that the movement thereof controls the flow of fluid through and pressure drop across said controllable orifice, first inductive means adapted to receive electrical impulses and to actuate said armature in response to said impulses, a second low reluctance structure disposed in said housing having spaced pole faces, a second armature pivotally mounted between said second pole faces, a diaphragm closing one end of said diaphragm chamber and actuable by variations in fluid pressure therein, means for actuating one end of said second armature in response to movement of said diaphragm, second inductive means disposed about said second structure for inducing a flux therein as a function of an alternating carrier signal, third inductive means movable with said second armature and arranged with respect to said second inductive means so as to have induced therein said carrier signal modulated in accordance with the movement of said second armature, and means for utilizing the modulated signal output of said third inductive means to affect the electrical impulses received by said first inductive means.

2. A hydraulic pressure system for providing a hydraulic pressure output proportional to a continuously varying condition comprising a converter assembly including a housing having an inlet and an outlet, a first bore in said housing in series flow relationship between said inlet and said outlet, regulating means in said first bore for controlling the flow of hydraulic fluid therethrough, a second bore in said housing in series flow between said first bore and said outlet, pressure modulating electrically actuatable valve means in said second bore for controlling the flow of hydraulic fluid therethrough, a third bore in said housing in series flow between said second bore and said outlet, pressure transducer means including a diaphragm chamber in said third bore, said diaphragm chamber being in series flow between said second bore and said outlet, said pressure transducer means including a low reluctance structure having spaced pole faces, an armature mounted for pivotal movement between said pole faces, means for actuating said armature in response to fluid pressure changes in said diaphragm chamber, means for inducing an alternating flux in said armature, and means for deriving an alternating electrical signal in response to said flux modulated in accordance with the movement of said armature, said system also including an electrical amplifier for controlling said modulating valve means and having an input, and means for applying said signal to the input of said amplifier in predetermined relationship with a signal derived in response to the continuously variable condition.

References Cited in the file of this patent
UNITED STATES PATENTS

| | | |
|---|---|---|
| 540,154 | Dreisoerner | May 28, 1895 |
| 2,518,161 | McNaney | Aug. 8, 1950 |
| 2,523,198 | Davies | Sept. 19, 1950 |
| 2,615,658 | Young | Oct. 28, 1952 |
| 2,647,258 | McCoy | July 28, 1953 |
| 2,662,540 | Rotherford | Dec. 15, 1953 |
| 2,686,893 | Markson | Aug. 17, 1954 |
| 2,697,417 | Mayer | Dec. 21, 1954 |
| 2,698,023 | Eckman | Dec. 28, 1954 |
| 2,709,421 | Avery | May 31, 1955 |
| 2,745,423 | Grogan | May 15, 1956 |
| 2,748,355 | Jarvis | May 29, 1956 |
| 2,758,288 | Shannon | Aug. 7, 1956 |
| 2,759,129 | Swartwout | Aug. 14, 1956 |
| 2,767,689 | Moog | Oct. 23, 1956 |
| 2,775,254 | Stanbury | Dec. 25, 1956 |
| 2,790,427 | Carson | Apr. 30, 1957 |
| 2,793,075 | Gulick | May 21, 1957 |
| 2,797,666 | Chubbuck | July 2, 1957 |